United States Patent [19]

Ichii et al.

[11] Patent Number: 4,849,457

[45] Date of Patent: Jul. 18, 1989

[54] METHOD OF PRODUCING PLASTIC SHEET WITH POROUS SURFACE

[75] Inventors: Masaru Ichii; Shigeru Tani; Kozo Fukuda, all of Tokyo, Japan

[73] Assignee: Nisshinbo Industries, Inc., Tokyo, Japan

[21] Appl. No.: 11,121

[22] Filed: Feb. 5, 1987

[30] Foreign Application Priority Data

Feb. 24, 1986 [JP] Japan .................................. 61-37262

[51] Int. Cl.$^4$ ................................................ C08J 9/28
[52] U.S. Cl. ........................................ 521/62; 264/41; 264/45.1; 264/233; 264/340; 264/344; 521/63; 521/64; 521/134; 521/139
[58] Field of Search ................ 264/41, 45.1, 340, 233, 264/344; 521/62, 63, 64, 134, 139

[56] References Cited

U.S. PATENT DOCUMENTS 4,595,503 6/1986 Schindler et al. ................ 264/41 X
4,605,526 8/1986 Reynhout et al. .................... 264/41

Primary Examiner—Philip Anderson
Attorney, Agent, or Firm—Burns, Doane, Swecker & Mathis

[57] ABSTRACT

A method of producing a plastic sheet with a porous surface layer suitable for use as, for example, a recording medium on which characters and images are printed by ink jet or thermal-transfer printing method. The method comprises preparing a solution by dissolving two or more kinds of plastics having low levels of miscibility to each other in a solvent, applying said solution to a substrate, passing said substrate with said solution applied thereto through a liquid which dissolves said solvent but does not dissolve said plastics thereby solidifying said plastics, and drying said substrate with the solidified plastic layer. Preferably, two or more kinds of plastics having low levels of miscibility to each other include mainly a material A which is vinyl chloride or its compolymer and a material B which is acrylonitrile or its copolymer.

14 Claims, 1 Drawing Sheet

SURFACE
SURFACE LAYER
SUBSTRATE

SURFACE
SURFACE LAYER
SUBSTRATE

METHOD OF PRODUCING PLASTIC SHEET WITH POROUS SURFACE

BACKGROUND OF THE INVENTION

The present invention relates to a method of producing a plastic sheet with porous surface. The plastic sheet produced by the method of the present invention is suitable for use as a synthetic paper for printing characters and images thereon by a press or a printer. The plastic sheet, with its substrate removed, is suitable for use as a porous synthetic film for filtrating and separating various substances.

Nowadays, synthetic papers made of plastics have spreading use by virtue of their waterproof nature and other superior properties. Such synthetic papers are produced by a method such as that disclosed in Japanese Patent Publication No. 25430/1974.

In recent years, new types of printers such as ink jet printers and thermal-transfer printers have been developed and put into practical use. It is known that sheets with smooth surface, such as synthetic sheets, are preferably used for obtaining high degree of clarity of the characters and images printed by such new types of printers.

The synthetic sheet produced by the method disclosed in Japanese Patent Publication No. 25430/1974 however, involves a problem in that, when it is used for printing by a thermal-transfer type, characters printed thereon tend to be distorted as if the ink flowed on the sheet.

This is attributable to the fact that, due to small porosity of the surface layer, the synthetic sheet exhibits only a small absorbability.

Through an intense study, the present inventors have succeeded in developing a novel method of producing a plastic sheet with a porous surface layer having a high porosity.

SUMMARY OF THE INVENTION

Accordingly, an object of the present invention is to provide a method of producing a plastic sheet with a porous surface layer having a high porosity, thereby overcoming the problems of the prior art.

To this end, according to the present invention, there is provided, in a method of producing a plastic sheet with a porous surface layer having the steps of preparing a solution by dissolving plastics in a solvent, applying the solution to a substrate, passing the substrate with the solution applied thereto through in a liquid which dissolves said solvent but does not dissolve the plastics so as to solidify the solution, and then drying said substrate with the solidified plastics layer, an improvement which comprises that two or more kinds of plastics having low levels of miscibility to each other are used as the plastics.

Examples of combination of plastics which exhibit small miscibility to each other are polyester and polyurethane, and acrylonitrile-styrene copolymer resin and cellulose acetate. The best result is obtained with the combination of (A) polyvinyl chloride or copolymer of vinyl chloride, and (B) polyacrylonitrile or copolymer of acrylonitrile.

The copolymer of vinyl chloride (A) is preferably a copolymer with vinyl acetate or maleic acid, and the copolymer of acrylonitrile (B) is preferably a copolymer with an acrylate ester or vinyl acetate. The copolymer (B) can contain a small amount of sodium allylsulfonate. It is possible to form porous structures with these combinations. This is considered to be attributable to the fact that the solubility parameter of polyvinyl chloride (9.5 to 9.7) is far from that of polyacrylonitrile (15.4). From a practical point of view, however, both the materials (A) and (B) are used in the forms of copolymers, because the copolymers are easier to dissolve and exhibit higher stability when the mixture liquid is applied to a substrate.

In order to enhance the stability of the solution mainly constituted by the materials (A) and (B), it is possible to add a polymer, oligomer, monomer or a pigment to the solution.

The method in accordance with the present invention has the following steps.

(1) Dissolving, in a solvent, two or more kinds of plastics of the above-mentioned combination, so as to form a solution (2) Applying the solution to a substrate by an ordinary application or coating method (3) Causing the substrate with the solution applied thereto to be solidified in a solvent which dissolves the solvent of the coating layer but does not dissolve the two or more kinds of plastics which are basic constituents, with the addition of a substance soluble to the solidifying liquid as desired (4) Causing the substrate with the coating layer to pass through a bath of a liquid of the same type as the solidifying liquid maintained at 60° C. or higher, preferably 80° C. or higher, thereby promoting the separation of solvent and formation of pores (5) Draining and drying the substrate with the coating layer, if necessary, followed by application of an anti-charging agent, thus obtaining a plastic sheet with a porous surface layer as shown in FIG. 1.

It is possible to effect a suitable treatment for promoting the phase separation in advance of the Step (3). Such a treatment can be carried out by one of the following methods (a) to (c).

(a) To immerse the substrate coated with the plastic obtained in Step (2) in a bad solvent solution which contains a large amount of solvent capable of dissolving the plastics, thereby promoting the phase separation.

(b) To promote the phase separation by blowing vapor of a bad solvent.

(b) To leave the substrate in the atmosphere until the phase separation proceeds.

According to this method, it is possible to obtain a plastic sheet having a substrate and a highly porous surface layer on the substrate. The mechanism which produces such effect of forming fine pores has not been theoretically clarified yet, but the inventors assume the reasons as follows.

(1) Two kinds of plastics in the coating solution, which exhibits low miscibility to each other, assume the form in which the plastic of the smaller content is dispersed in the form of particles within the plastic of the larger content.

(2) During the solidification, two kinds of plastics are concentrated in such a manner as to move way from each other, thus forming voids or pores therebetween.

(3) The voids or pores are enlarged during a subsequent heating, particularly when the plastic of the smaller content exhibits large contraction during solidification and heating.

Unfortunately, the inventors have not found any definite answer to a question why the pores continue to and appear in the surface.

The plastic sheet with porous surface layer produced by the method of the present invention exhibits, by virtue of the high porosity in the surface thereof, superior absorbability which in turn ensures high quality of printing of characters and images when the sheet is used as a transfer sheet in a heat-melting type thermal-transfer printing apparatus.

The high porosity of the plastic sheet ensures a high degree of whiteness which in turn enhances the attractiveness of the printed image.

DESCRIPTION OF EXAMPLES

Figure 1:
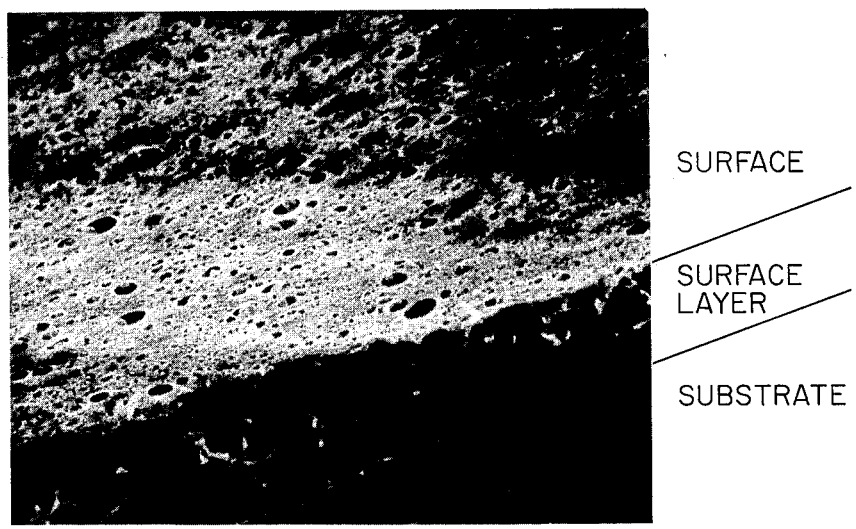
FIG. 1 is an electron microscopic photograph showing the surface, surface layer and a substrate of a plastic sheet produced by the method of the present invention.
Figure 2:
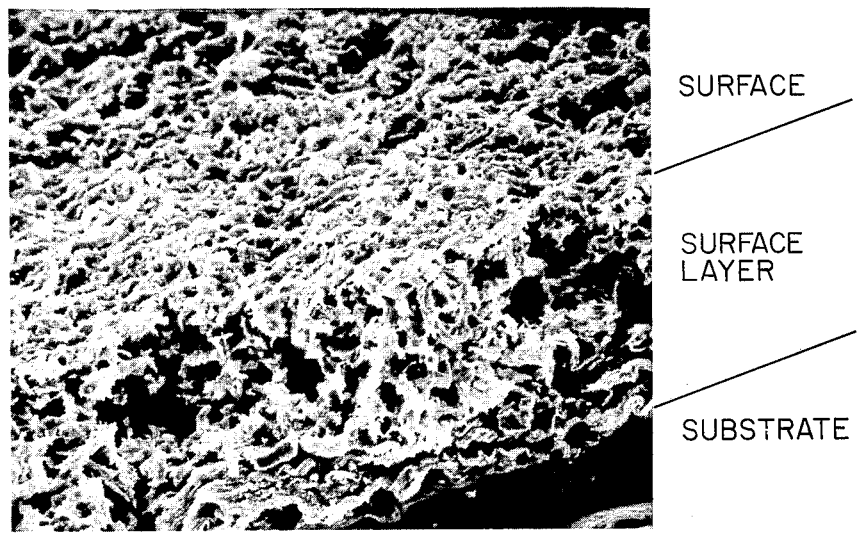
FIG. 2 is an electron microscopic photograph similar to that in FIG. 1 of a plastic sheet produced by a method disclosed in Japanese Patent Publication No. 25430/1974.

Examples of the invention will be described hereinunder.

Example 1

100 parts (parts by weight, hereinafter) of polyvinyl chloride was dissolved in 400 parts of DMF (dimethyl formamide), thus preparing the material A. Meanwhile, the material B was prepared by dissolving 100 parts of polyacrylonitrile in 400 parts of DMF. The materials A and B were mixed together at a ratio of A:B=5:3. This mixture was applied to a polyester film coated with a thin layer of unsaturated polyester resin. The film with the mixture applied thereto was immersed in water of 20° C. for 1 minute, followed by immersion in hot water of 90° C. for 5 seconds. The substrate with the mixture layer was then dried with air and finally an anti-charging agent (Chemistat 6300H produced by Sanyo Chemical Industries Co., Ltd.) was applied. Numerous fine pores were observed in the thus formed plastic sheet, through an electron microscope. The product sheet also was subjected to test printing with a heat-melt type thermal-transfer printer. Characters and images were printed with fine dots at a high reproducibility, without suffering from any flow of ink. Example 2

A vinyl chloride-vinyl acetate copolymer was prepared with the ratio of the former to the latter of 9:1, and 100 parts of this copolymer was dissolved in 400 parts of DMF, thus forming the material A. On the other hand, the material B was prepared by dissolving 100 g of acrylonitrile-methyl acrylate copolymer (94:6) in 400 parts of DMF. A mixture was then formed from 100 parts of the material A, 40 parts of the material B and 10 parts of titanium dioxide. The thus formed mixture was applied, solidified and dried in the same manner as Example 1. A plastic sheet thus prepared showed superior properties well comparing with that shown by Example 1.

Example 3

100 parts of vinyl chloride-vinyl acetate copolymer resin (S-Lec C produced by Sekisui Chemical Co., Ltd.) was dissolved in 400 parts of DMF, thus forming the material A. Meanwhile, the material B was prepared by dissolving 100 parts of acrylic resin (Beslon W-241 produced by Toho Rayon Co., Ltd.) in 400 parts of DMF. In addition, the material C was prepared by dissolving 100 parts of polyvinyl pyrrolidone (Lubiscol K-90 produced by Union Carbide) in 600 parts of DMF. The materials A, B and C were mixed together at a mixing ratio of A:B:C=5:2:1. The mixture was applied to a polypropylene film coated with chlorinated polypropylene. The polypropylene film having the mixture layer applied thereto was immersed in water for 1 hour and then in hot water of 80° C. for 5 seconds, followed by drying with air. A test printing was conducted with the thus obtained plastic sheet, by thermal-transfer printing method which makes use of an ink carrier sheet having a porous ink holding layer or a filler layer referred to as "stone-wall structure", the ink carrier sheet being meltable by application of heat so as to transfer the ink, thus enabling images to be printed with a good reproducibility of densities. The test printing proved that the plastic sheet of Example 3 ensures a high degree of reproducibility of image.

Example 4

100 parts of vinylchloride-vinylacetate copolymer (S-Lec C produced by Sekisui Chemical Co., Ltd.) was dissolved in 400 parts of DMF, thus preparing the material A. The material B was prepared by dissolving 100 parts of acrylic resin (Beslon W-241 produced by Toho Rayon Co., Ltd.) in 400 parts of DMF. Meanwhile, a material C was prepared by dissolving 100 parts of polyvinyl butyral (S-Lec BM2 produced by Sekisui Chemical Co., Ltd.) in 400 parts of DMF. The materials A, B and C were mixed at a ratio of A:B:C =5:2:2. A treatment similar to that in Example 1 was conducted so that a white plastic sheet was obtained as the product. A test printing was conducted on this white plastic sheet by heat-melting type thermal-transfer printing apparatus. As a result, a high degree of reproducibility with fine dots and without any flow of ink was confirmed.
Example 5

A mixture was formed by mixing 50 parts of the material A used in Example 3, 30 parts of the material B used in Example 3, and 10 parts of acrylate ester oligomer (Aronix 6200 produced by Toa Synthetic Chemical Co., Ltd.). The mixture was applied to a polyerster film and the film with the mixture layer was immersed in water for 1 minute and then in hot water of 90° C. for 5 seconds, followed by air drying. The plastic sheet thus formed was irradiated with an electron beam of 5 Mega Rad. Finally, the surface layer was peeled off from the polyester film, whereby a porous plastic sheet was obtained. This porous plastic sheet showed a high tensile strength despite its porous structure and was insoluble in various types of solvents.

Example 6

Solutions (A), (B) and (C) were prepared, respectively, as follows:
(A) 100 parts of vinylchloride-vinylacetate copolymer (S-Lec C produced by Sekisui Chemical Co., Ltd.) was dissolved in 400 parts of DMF.
(B) 100 parts of acrylic resin (Beslon W-241 produced by Toho Rayon Co., Ltd.) was dissolved in 400 parts of DMF.
(C) 100 parts of polyvinyl butyral (S-Lec BMS produced by Sekisui Chemical Co., Ltd.) was dissolved in 326 parts of DMF.

These solutions were mixed at a ratio of (A):(B):(C)=9:5:2. The mixture was applied to a polypropylene film which has been beforehand coated with a thin layer of chlorinated polypropylene. The film thus coated with the mixture was left for 20 seconds at the room temperature and was immersed for 1 minute in water of 20° C., followed by dipping in hot water of 90° C. for 5 seconds. The film was then dried by air and an anti-charging agent was applied to the dried film. An observation through an electron microscope proved that a multiplicity of pores of comparatively large sizes are distributed over the whole surface area. A test printing was conducted with this film by a melting thermal-transfer type printing apparatus. The test proved that fine dots were produced with high reproducibility, without suffering from inconveniences such as flow of ink or reversing of ink when ink dots are superposed.

Example 7

Coating was conducted by the same method as Example 6 using the same coating mixture as that used in Example 6. The film was then dried for 3 seconds by wind of 6 m/sec produced by a fan. The film was then immersed in water of 20° C. for one minute, followed by 5 seconds dipping in hot water of 90° C. The film was then dried by air and the same anti-charging agent as that used in Example 6 was applied. The film thus prepared showed excellent properties well comparing with those of the film obtained in Example 6.

What is claimed is:

1. A method of producing a plastic sheet with a porous surface layer characterized by having the steps of preparing a solution by dissolving two or more kinds of plastics having low levels of miscibility to each other in a solvent, wherein said two or more kinds of plastics having low levels of miscibility to each other include mainly a material A which is polyvinyl chloride or copolymer of vinyl chloride and a material B which is polyacrylonitrile or copolymer of acrylonitrile, applying said solution to a substrate, passing said substrate with said solution applied thereto through a liquid which dissolves said solvent but does not dissolve said plastics thereby solidifying said plastics, and drying said substrate with the solidified plastics layer.

2. The method of producing a plastic sheet according to claim 1, wherein said two or more kinds of plastics having low levels of miscibility to each other include mainly a material A which is polyester and a material B which is polyurethane.

3. The method of producing a plastic sheet according to claim 1, wherein said two or more kinds of plastics having low levels of miscibility to each other include mainly a material A which is cellulose acetate and a material B which is acrylonitrile-styrene copolymer.

4. The method of producing a plastic sheet acording to claim 1, wherein said two or more kinds of plastics having low levels of miscibility to each other include mainly a material A which is vinyl chloride-vinyl acetate copolymer and a material B which is acrylonitrile-methyl acrylate copolymer.

5. The method of producing a plastic sheet according to claim 1, wherein said two or more kinds of plastics having low levels of miscibility to each other include mainly a material A which is vinyl chloride-vinyl acetate copolymer and a material B which is acrylic resin.

6. The method according to claim 1, wherein said prepared solution further comprises a member selected from the group consisting of a polymer, oligomer, monomer and pigment.

7. The method according to claim 1, wherein said prepared solution further comprises a member selected from the group consisting of titanium dioxide, polyvinyl pyrrolidone, polyvinyl butyral and acrylate ester oligomer.

8. The method according to claim 1, wherein the step of passing said substrate through a liquid further comprises the substeps of:
   (i) immersing said substrate in a first portion of said liquid at about room temperature, and thereafter
   (ii) immersing said substrate in a second portion of said liquid having a temperature of at least 60° C.

9. The method according to calim 1, further comprising the step of coating said substrate with a thin layer of chlorinated polypropylene prior to the step of applying said solution to said substrate.

10. The method according to claim 9, further comprising the step of air drying said substrate at room temperature for a predetermined length of time prior to said step of passing said substrate through said liquid.

11. The method according to claim 9, further comprising the step of blow drying said substrate at room temperature for a predetermined length of time prior to said step of passing said substrate through said liquid.

12. The method according to claim 1, wherein said solidified plastics layer comprises a substantially uniform pore size throughout.

13. A plastic sheet with a porous surface layer produced according to the method of claim 1.

14. A method of producing a plastic sheet with a porous surface layer comprising the steps of:
   (a) dissolving, in a solvent, two or more kinds of plastics having low levels of miscibility to each other, wherein said plastics include mainly polyvinyl chloride or copolymer of vinyl chloride and polyacrylonitrile or copolymer of acrylonitrile thereby forming a solution wherein the plastic being present as a minor component is dispersed in the form of particles within the plastic being present as a major component;
   (b) coating the surface of a substrate with a layer of said solution;
   (c) passing said coated substrate through a first portion of a liquid maintained at room temperature which dissolves said solvent but does not dissolve said plastics thereby solidifying said plastics in such a manner as to move away from each other thus forming pores therebetween;
   (d) passing said coated substrate through a second portion of said liquid maintained at a temperature of at least 60° C. thereby enhancing the separation of said solvent from said plastics and enlarging said pores by the further contraction of said plastics; and
   (e) drying said solidified plastics coated substrate.

* * * * *